(12) United States Patent
Riehl et al.

(10) Patent No.: US 11,664,714 B2
(45) Date of Patent: May 30, 2023

(54) POSITION SENSOR ASSEMBLY, POSITION-DETERMINING METHOD, AND LINEAR ACTUATOR

(71) Applicant: EWELLIX AB, Gothenburg (SE)

(72) Inventors: Christoph Riehl, Liestal (CH); Marcel Soltermann, Liestal (CH)

(73) Assignee: Ewellix AB, Gothenburg (SE)

( * ) Notice: Subject to any disclaimer, the term of this patent is extended or adjusted under 35 U.S.C. 154(b) by 323 days.

(21) Appl. No.: 16/923,328

(22) Filed: Jul. 8, 2020

(65) Prior Publication Data

US 2021/0010830 A1    Jan. 14, 2021

(30) Foreign Application Priority Data

Jul. 10, 2019   (DE) .............................. 102019118693

(51) Int. Cl.
| | | |
|---|---|---|
| H02K 41/02 | (2006.01) | |
| G01D 5/241 | (2006.01) | |
| F16H 25/20 | (2006.01) | |
| H02K 11/21 | (2016.01) | |
| H02K 7/06 | (2006.01) | |

(52) U.S. Cl.
CPC ......... *H02K 41/02* (2013.01); *F16H 25/2015* (2013.01); *G01D 5/241* (2013.01); *G01D 5/2415* (2013.01); *H02K 7/06* (2013.01); *H02K 11/21* (2016.01)

(58) Field of Classification Search
CPC .. G01D 5/241; G01D 5/2415; G01D 5/34746; G01D 5/34753; H02K 7/06; H02K 11/21; H02K 41/02; F16H 25/2015
See application file for complete search history.

(56) References Cited

U.S. PATENT DOCUMENTS

| | | |
|---|---|---|
| 4,841,225 A | 6/1989 | Meyer |
| 4,959,615 A | 9/1990 | Andermo |
| 5,077,635 A | 12/1991 | Bollhagen et al. |
| 5,574,381 A * | 11/1996 | Andermo ............... G01B 3/205 340/870.37 |
| 5,896,032 A | 4/1999 | Yagi et al. |

(Continued)

FOREIGN PATENT DOCUMENTS

| | | |
|---|---|---|
| CN | 87107060 A | 5/1988 |
| CN | 1147084 A | 4/1997 |

(Continued)

OTHER PUBLICATIONS

English translation for DE3115508 cited in IDS filed Jul. 8, 2020 (Year: 1989).*

*Primary Examiner* — Steven L Yeninas
(74) *Attorney, Agent, or Firm* — Laurence A. Greenberg; Werner H. Stemer; Ralph E. Locher

(57) ABSTRACT

A position sensor includes first and second sensor components. The second sensor component has a reading unit that is configured to evaluate a capacitive signal in relation to the position of the second sensor component relative to the first sensor component. The position sensor is in addition configured to provide the result of the evaluation at an interface of the first sensor component. A method for ascertaining a position of a second sensor component of a position sensor relative to a first sensor component of the position sensor as well as a linear actuator, are provided.

13 Claims, 3 Drawing Sheets

(56) References Cited

U.S. PATENT DOCUMENTS

| | | | |
|---|---|---|---|
| 6,700,391 B2 | 3/2004 | Strack et al. | |
| 10,845,219 B2 | 11/2020 | Erlich et al. | |
| 2016/0161292 A1* | 6/2016 | Rohner | G01D 5/2415 |
| | | | 324/662 |
| 2017/0012519 A1* | 1/2017 | Neff | G01D 5/34753 |
| 2018/0091017 A1* | 3/2018 | Driker | H02K 7/003 |
| 2019/0056247 A1* | 2/2019 | Erlich | G01D 5/2492 |

FOREIGN PATENT DOCUMENTS

| | | |
|---|---|---|
| CN | 1386187 A | 12/2002 |
| CN | 109075690 A | 12/2018 |
| DE | 3115508 A1 | 3/1982 |
| DE | 69031688 T2 | 4/1998 |
| DE | 69623539 T2 | 6/2003 |
| DE | 202013002022 U1 | 6/2013 |
| DE | 102016208509 A1 | 11/2017 |
| EP | 0459118 A1 | 12/1991 |

\* cited by examiner

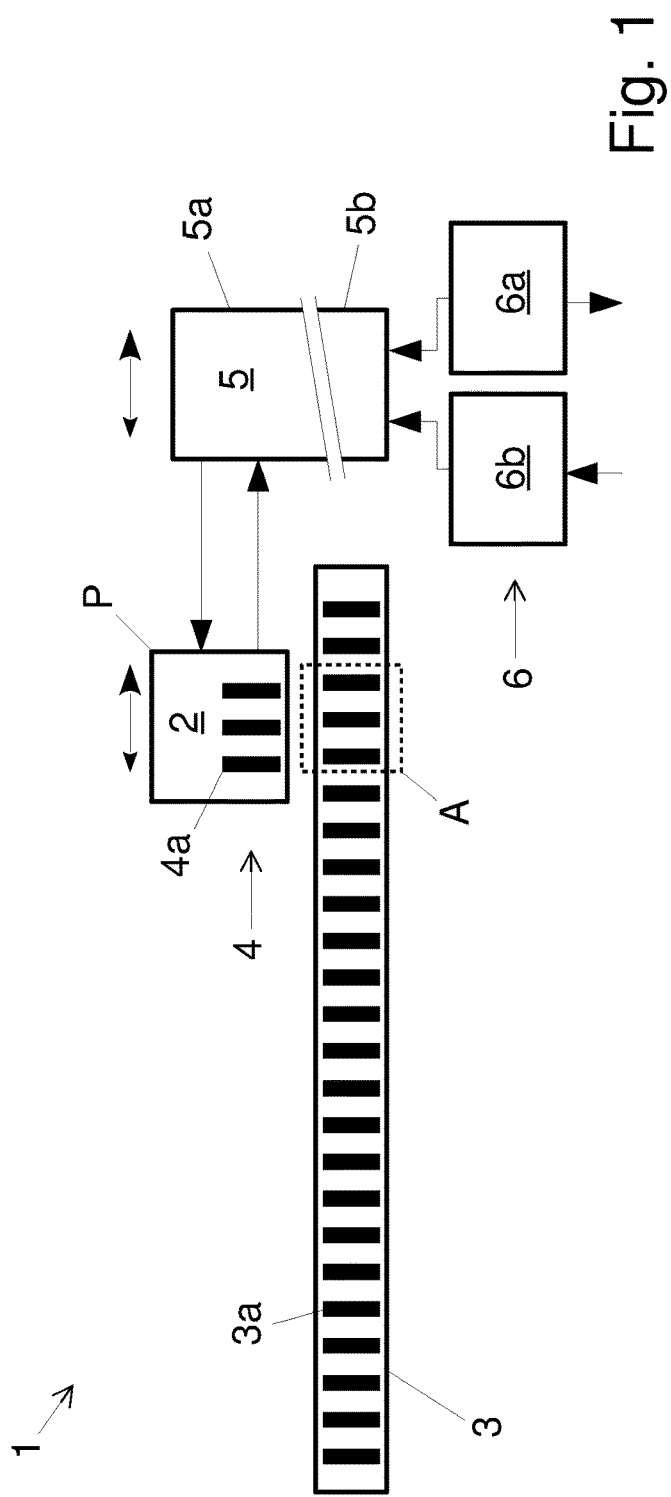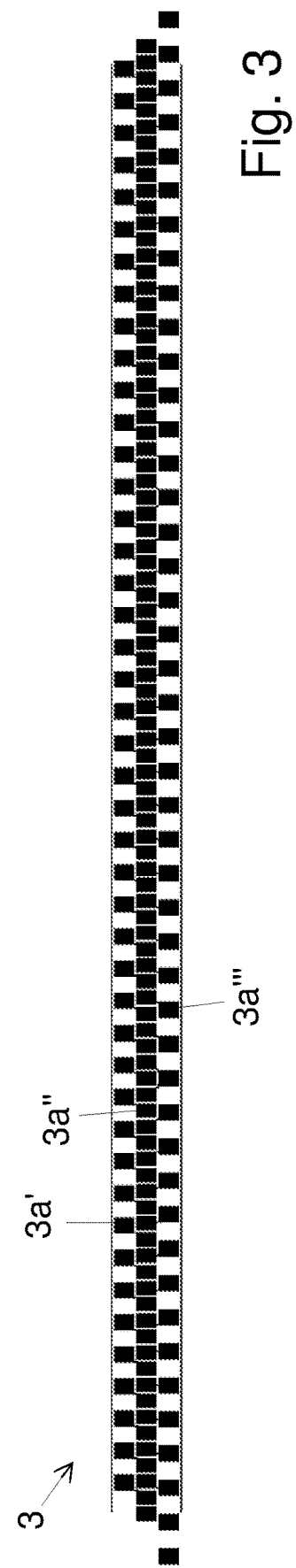

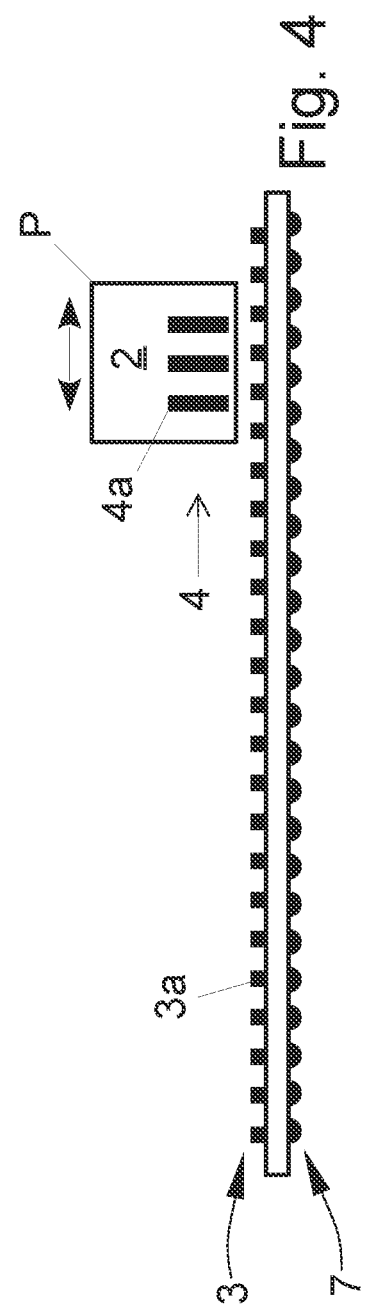
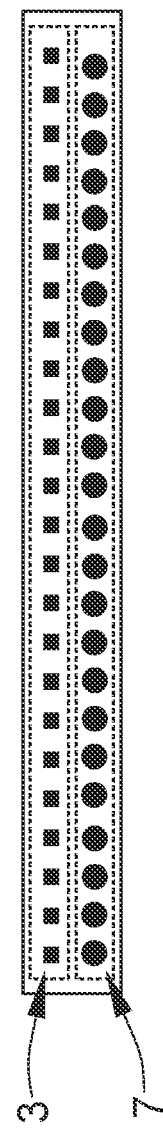

POSITION SENSOR ASSEMBLY, POSITION-DETERMINING METHOD, AND LINEAR ACTUATOR

CROSS-REFERENCE TO RELATED APPLICATION

This application claims the priority, under 35 U.S.C. § 119, of German Patent Application DE 10 2019 118 693, filed Jul. 10, 2019; the prior application is herewith incorporated by reference in its entirety.

BACKGROUND OF THE INVENTION

Field of the Invention

The present invention relates to a position sensor, in particular for a linear actuator, a method for ascertaining a position of a second sensor component of a position sensor relative to a first sensor component of the position sensor, and a linear actuator.

Position sensors are used in many technical fields in order to ascertain the relative position of components or component groups that are mounted movably with respect to one another. Such components or component groups that are mounted movably with respect to another are found, for example, in linear actuators that are used in many technical systems in order to carry out linear movements. Electric linear actuators usually consist here of a motor and of a gear driven by the motor that transfers a rotary movement to a conversion element for converting the rotary movement into a linear movement of a linear unit. This conversion element can, for example, be a spindle, a chain, a belt or a toothed rack.

Feedback about the position of the linear unit can, for example, be necessary in order to electrically limit a mechanical movement path of the linear actuator, in order to enable precise positioning, or in order to give other systems information about the current position of the linear unit. Until now, such position feedback has frequently been provided by incremental encoders known as incremental transducers. These systems are, however, often complex, and require a large number of components, as a result of which they become expensive. An incremental transducer, for example, usually needs two sensors, a calculating unit and a backup unit. When the linear unit moves, the two sensors output signals phase-shifted electrically by 90°, from which the distance covered and the direction of movement of the linear unit can be ascertained. On the basis of the distance covered and the direction of movement, the calculation unit can determine a position of the linear unit. The current position information can be lost when switching off or in the event of power failure. To prevent this, the backup unit can store the current position information. Incremental transducers may, however, still need to be referenced again after switching on, since changes in the position while in the switched-off state cannot be registered.

BRIEF SUMMARY OF THE INVENTION

It is an object of the present invention to improve position determinations, in particular to simplify them and to increase their reliability.

The subject is achieved through a position sensor, a method for ascertaining a position of a second sensor component of a position sensor relative to a first sensor component of the position sensor, and a linear actuator as claimed in the independent claims.

A position sensor, in particular for a linear actuator, comprises according to a first aspect of the invention two sensor components mounted such that they can move relative to one another. According to the invention, a first of the two sensor components comprises an interface and a second of the two sensor components comprises a reading unit that is configured to evaluate an in particular capacitive signal in relation to the position of the second sensor component relative to the first sensor component. The position sensor is here configured to provide the result of the evaluation at the interface.

One aspect of the invention is based on the approach of determining the position of a second sensor component that is arranged, for example, on a carriage mounted movably on a threaded spindle in a sheath tube of a linear actuator relative to a first sensor component that is arranged, for example, at the sheath tube. For example, at least one signal generated through a capacitive interaction of two or more electrodes can be evaluated, perhaps in respect of the phase, for this purpose. A reading unit that can be moved together with the second sensor component is provided here at the second sensor component, for example on the carriage. The reading unit is here preferably configured to generate an in particular capacitive signal and/or to evaluate it, at least in respect of the position of the second sensor component relative to the first sensor component. The first sensor component, perhaps a preferably passive component for generating or at least influencing the in particular capacitive signal, here comprises an interface, for example for the operation of the position sensor, i.e. for example in order to control the position sensor, to read out the result of the evaluation, to supply the position sensor with energy and/or the like. The first sensor component can, for example, be arranged at the sheath tube of a linear actuator or alternatively be part of the sheath tube. The capacitive determination, for example, of the position is advantageous, since it is contactless, i.e. essentially free from abrasion, and at the same time precise.

The first sensor component arranged, for example, at the sheath tube of a linear actuator forms, in a preferred manner, a ruler-like position reference or measuring scale with reference to the position in the sheath tube with which the reading unit can enter into in particular capacitive interaction. "Enter into capacitive interaction" refers here to the generation or at least influencing of electric fields that extend for example between mutually opposed electrodes. This is, for example, achieved in that the reading unit is or becomes positioned opposite a section of the first sensor component arranged, for example, at the sheath tube. The reading unit can here be configured to trigger, through the generation of a query signal, perhaps in the form of electric fields, a response signal in the section of the first sensor component arranged, for example, at the sheath tube, that is characteristic for the section of the first sensor component and thus for the positioning of the reading unit, for example relative to the sheath tube.

In the said example of a linear actuator, the arrangement of the reading unit at the carriage enables a particularly space-saving construction of the linear actuator, since the reading unit can be designed to be relatively compact, in particular in the axial direction. "Axial direction" refers here to a direction parallel to a longitudinal axis of the first sensor component and/or of the linear actuator, in particular to an axis of symmetry of the sheath tube. The first sensor component, arranged for example at the sheath tube, here extends preferably essentially along the entire length of the sheath tube, or at least along the movement path of the carriage inside the sheath tube. If this part of the position sensor were arranged at the movable carriage, and the reading unit at the sheath tube, the ruler-like part would, in certain positions of the carriage, protrude out of the sheath tube of the linear actuator.

The present invention altogether enables an improved determination of the position of components or component groups relative to one another.

The features of the preferred forms of embodiment described below can be combined arbitrarily with one another unless otherwise stated or technically impossible.

In one preferred form of embodiment, the first sensor component comprises a first electrode arrangement, arranged for example on the sheath tube, and extending along the sheath tube in an axial direction, in particular of a linear actuator. The first electrode arrangement here serves, in a preferred manner, as a ruler-like position reference for the reading device. The first electrode arrangement is, in a preferred manner, a passive component, for example a passive component of the position sensor, in particular of the first sensor component. Such an electrode arrangement can be designed in a particularly space-saving manner, inter alia since the first electrode arrangement does not have to be contacted mechanically, and therefore no mechanical stress, in particular no abrasion, occurs. The first electrode arrangement can, for example, be printed on an inner side of the sheath tube or inset into the sheath tube.

The first electrode arrangement is preferably designed, together with the reading unit in sections, to generate or at least to influence the capacitive signal, in particular for the section that lies opposite the reading unit of the first electrode arrangement, and thus characteristic of the position of the second sensor component. The first electrode arrangement can, for example, be configured to register electric fields generated by the reading unit and thereby to induce a capacitive signal, characteristic for the section, in the reading unit, perhaps through the generation of phase shifts.

In a further preferred form of embodiment, the first electrode arrangement comprises an electrode pattern, for example along the first sensor component, in particular of the sheath tube, varying in the axial direction, which characterizes the position relative to the first electrode arrangement. The electrode pattern is here preferably designed such that the capacitive interaction of the first electrode arrangement and the reading unit lying opposite the first electrode arrangement varies in the axial direction along the first sensor component. This permits the determination of the absolute position of the reading unit relative to the first electrode arrangement or of the carriage relative to the sheath tube. Such a construction of the electrode arrangement is advantageous since an initial referencing of the position sensor, for example through the specification of a start position of the carriage in the sheath tube, can be omitted.

The first electrode arrangement can, in particular, be designed such that position information is contained, perhaps encoded, in the electrode pattern. The characterization of the position on the first sensor component through the electrode pattern permits a precise, non-contacting or wireless determination of the absolute position.

In a further preferred form of embodiment, the first electrode arrangement is formed of a plurality of individual electrodes that differ in their form and/or in relation to their distance from one another. In particular, the electrode pattern can be formed by electrodes arranged in multiple, for example three, tracks along the first sensor component in the axial direction, wherein the shapes and/or the distances of the electrodes in the different tracks differ from one another. It is, for example, conceivable that the distance of the electrodes from one another and/or the width of the electrodes in a first track is smaller than in a second track but larger than in a third, central track arranged between the first and second tracks. In this way, the capacitive interaction between the section of the first electrode arrangement and of the reading unit varies along the first sensor component. This construction of the first electrode arrangement, in particular of the electrode pattern, can easily be implemented, for example by printing the electrodes, perhaps on the sheath tube or a component that is mounted at the sheath tube.

In a further preferred form of embodiment the second sensor component, in particular the reading device, comprises a second electrode arrangement, arranged lying opposite the first electrode arrangement, that is configured to provide the capacitive signal, in particular for evaluation by an evaluation electronics of the reading unit. The second electrode arrangement, in particular a number of electrodes of the second electrode arrangement, is, in a preferred manner, aligned perhaps in the axial direction with respect to the second electrode arrangement, so that, as it were, the first electrode arrangement and the second electrode arrangement, or their individual electrodes, lie essentially parallel to one another. The second electrode arrangement here is in particular arranged at the second sensor component in such a way that this alignment with respect to the first electrode arrangement is retained when there is a movement of the second sensor component relative to the first sensor component, for example of the carriage within the sheath tube. A second electrode arrangement can be constructed in a space-saving manner, for example particularly flat, and therefore easily arranged at, for example, the carriage. When, for example, there is capacitive interaction with electrodes in a section of the first electrode arrangement, the second electrode arrangement reliably supplies a capacitive signal, which can be evaluated in respect of the position of the second sensor component to the first sensor component.

The second electrode arrangement here preferably comprises a number of electrodes that can interact capacitively with the first electrode arrangement, in particular individual electrodes of the first electrode arrangement. The electrodes of the second electrode arrangement can here be arranged in groups, in particular in multiple tracks in the axial direction along the second sensor component, for example of the carriage. The second electrode arrangement, in particular its electrodes, are preferably configured to generate phase-shifted electric fields and/or to register response signals, in particular of the first electrode arrangement, in the form of electric fields with phase resolution, or to generate a corresponding capacitive signal.

In a further preferred form of embodiment, the second electrode arrangement is arranged on a side of a circuit board that faces the first sensor component, in particular the sheath tube, in particular of the first electrode arrangement. An evaluation electronics of the reading device is preferably arranged on a side of the circuit board that faces away from the first sensor component, in particular the sheath tube. The evaluation electronics is here preferably configured to evaluate the capacitive signal, for example to ascertain the position of the carriage in the sheath tube and in appropriate cases to generate corresponding position data that characterize the position of the carriage. Using both sides of the circuit board is particularly advantageous, since construction space is saved, and the evaluation device can therefore be arranged easily, for example on the carriage. In addition, due to the arrangement on a side of the circuit board that faces away from the first sensor component, the evaluation electronics, which may contain if appropriate capacitive elements, does not impair the capacitive interaction between the second electrode arrangement and the first electrode arrangement. A faulty determination of position can thereby be reliably avoided.

In one preferred form of embodiment, the position sensor comprises a transmission system for transmitting information regarding the position of the second sensor component relative to the first sensor component, i.e. position information and/or energy, between the reading unit and the interface. The transmission system makes it possible for the position information and/or the energy, perhaps for operation of the position sensor, in particular of the reading unit, to be provided at the second sensor component that is mounted movably opposite the first sensor component and thereby also to the interface.

The transmission system can, for example, be configured to transmit information to the interface relating to the position of the carriage relative to the sheath tube that has been obtained through evaluation of the capacitive signal. This information can then be made available externally via the interface, i.e. to potential other devices such as, perhaps, a control device for control of a drive associated with the linear actuator. In a preferred manner, the transmission system is also used for the transmission of energy for operation of the position sensor, in particular of the reading unit. The energy can be made available here from outside the linear actuator to the interface, perhaps through the connection of the interface to a power supply.

The transmission system is preferably configured to transmit the position information and the energy for operation of the position sensors, in particular of the reading unit, at least partially wirelessly, in particular electromagnetically or inductively, between the interface and the reading unit. In this way, components, such as for example cables that can become worn as a result of the movement of the second sensor component relative to the first sensor component, can be omitted. It is, however, also conceivable that the transmission system comprises a transmission unit such as, perhaps, a flexible cable, a flexible circuit board and/or the like. A more robust transmission of information or of energy, which is, for example, less susceptible to interference from external fields, can be achieved in this way.

Preferably the transmission system is configured to transmit information relating to the position of the second sensor component and energy between the reading unit and the interface sequentially, in particular in alternation. The transmission system can, for example, be configured to transmit, in particular within one cycle, the position information first and then the energy. This cycle can then be repeated.

In a further preferred form of embodiment, the transmission system is designed as an antenna system, wherein the first electrode arrangement and/or the second electrode arrangement form, in a preferred manner, components of the antenna system. The first and/or second electrode arrangement can, for example, form antenna units or at least part thereof. The use of the first and/or second electrode arrangement as part of the antenna system makes a particularly space-saving design of the antenna system possible, in particular the omission of additional components that make the position sensor or the linear actuator more complex and thereby also more subject to error. In other words, the first and/or second electrode arrangement can in this way be used particularly efficiently.

Sequential operation of the first and/or second electrode arrangement, for example a sequential application of an alternating voltage, makes it possible to use the first and second electrode arrangement efficiently in sequence for position determination through evaluation of the capacitive signal, for transmission of position information, and for inductive transmission of energy.

In a further preferred form of embodiment, the antenna system comprises a first antenna arrangement connected to the interface and a second antenna arrangement lying opposite the first antenna arrangement connected to the reading unit. The first antenna arrangement here preferably extends in the axial direction along the first sensor component, e.g. of the sheath tube. The second antenna arrangement is preferably integrated into the reading unit. The first and/or second antenna arrangement can here be provided additionally for the first and/or second electrode arrangement. Alternatively, the first and/or second antenna arrangement can however also be formed from the first or second electrode arrangement. Antenna arrangements that can in particular be of flat and therefore space-saving design, can easily be integrated into the position sensor or the linear actuator, in particular into the sheath tube and/or the reading unit. The provision of antenna arrangements allows wireless transmission of position information and energy, and reduces abrasion.

In a further preferred form of embodiment, the first electrode arrangement and the first antenna arrangement of the antenna system together form one component that extends in the axial direction, in particular along the first sensor component or of the sheath tube. The first antenna arrangement can in particular be formed of the first electrode arrangement. Alternatively, the first electrode arrangement and the first antenna arrangement can comprise a common carrier, or be applied, for example printed, thereon. It is, for example, conceivable that the first antenna arrangement and the first electrode arrangement are arranged on the same circuit board, wherein the circuit board extends in the axial direction along the first sensor component. This allows efficient utilization of components, and at the same time simplifies the precise arrangement both of the first electrode as well as of the antenna arrangement, for example relative to the movement path of the carriage and thus to the reading unit, in particular the second electrode and/or antenna arrangement.

In a further preferred form of embodiment, the first antenna arrangement is arranged on a side of the component that faces away from the reading unit. The first antenna arrangement can, for example, be arranged on the rear of a circuit board, while the first electrode arrangement is arranged on a front side of the circuit board that faces the reading unit, in particular the second electrode arrangement. This allows the component, perhaps the circuit board, to be manufactured easily. In addition, the use of both sides of the component permits an efficient utilization of the surface of the component, whereby again construction space can be saved.

In a further preferred form of embodiment, the first electrode arrangement and the first antenna arrangement are each arranged in a section of the component on a side that faces the reading unit. The two sections here preferably extend along the first sensor component, in particular of the sheath tube, parallel to one another in the axial direction. The first electrode and antenna arrangement in particular extend adjacently to one another. Preferably, the reading unit is here designed in such a way that the second electrode and antenna arrangement are also arranged next to one another, opposite to the first electrode and/or antenna arrangement. The arrangement of the first electrode and antenna arrangement on the same side facing the reading unit has the advantage that the coupling both between the electrodes and the antenna arrangements is particularly good. High signal strengths, both for the capacitive signal and during the transmission of position information can, for example, be achieved in this way.

In a further preferred form of embodiment, the reading device is configured to generate position data on the basis of the in particular capacitive signal that characterizes the position of the second sensor component, in particular of the carriage, relative to the first sensor component, in particular of the sheath tube. Evaluation electronics of the reading device can, for example, be configured to ascertain the relative position of the second sensor component with respect to the first and to generate corresponding position data on the basis of the capacitive signal. The evaluation electronics is configured for this purpose in a preferred manner to evaluate the response signals of the first electrode arrangement in the form of electric fields with phase resolution. Such position data can be transmitted particularly easily to the interface, made available by this, and, if appropriate, processed further by other devices. It is as a result in particular not necessary to provide an additional computing unit that performs the evaluation of the capacitive signal or generates position data suitable for further processing.

In one method for ascertaining a position of a second sensor component of a position sensor, in particular for a linear actuator, relative to a first sensor component of the position sensor according to a second aspect of the invention, a capacitive signal is evaluated by a reading unit of the second sensor component in terms of the position of the second sensor component relative to the first sensor component, which comprises an interface, and makes the result available to an interface.

In one preferred form of embodiment, information based on the evaluation of the capacitive signal, i.e. position information, is transmitted from the reading device to the interface and/or energy is transmitted from the interface to the reading device via a first antenna arrangement of the first sensor component and a second antenna arrangement of the second sensor component arranged opposite the first antenna arrangement, said transmission in particular taking place wirelessly, perhaps electromagnetically or inductively. It is, in principle, also conceivable for additional data, for example relating to the operating state of the position sensor and/or the linear actuator, for control of the position sensor and/or of the linear actuator, in particular with the aid of the transmission system, to be transmitted between the reading device and the interface. A first electrode arrangement of the position sensor can here be used as the first antenna arrangement and a second electrode arrangement of the position sensor as the second antenna arrangement. Alternatively, the first or second electrodes and antenna arrangements can be designed as common components. In both cases, this enables a compact transmission system for communication with the reading unit and for its energy supply, which can easily be integrated into, for example, a linear actuator.

A linear actuator according to a third aspect of the invention comprises a sheath tube and a carriage mounted, movably relative to the sheath tube, inside the sheath tube, as well as a position sensor on the sheath tube and on the carriage with a reading unit arranged on the carriage. The reading unit is configured to evaluate a capacitive signal in relation to the position of the carriage relative to the sheath tube.

The above-described advantages of the first aspect of the invention apply correspondingly also to the second and third aspect of the invention, and vice versa.

The invention is explained below in more detail with reference to figures, at least partially in a schematic manner:

BRIEF DESCRIPTION OF THE SEVERAL VIEWS OF THE DRAWING

FIG. 1 shows an example of a position sensor for determining a position of a carriage relative to a sheath tube of a linear actuator;

FIG. 3 shows an example of a first electrode arrangement;

FIG. 4 shows an example of a first electrode assembly and a first antenna arrangement forming one component; and FIG. 5 shows an example of a first electrode assembly and a first antenna arrangement being arranged in two neighboring sections on a circuit board.

DESCRIPTION OF THE INVENTION

Figure 2:
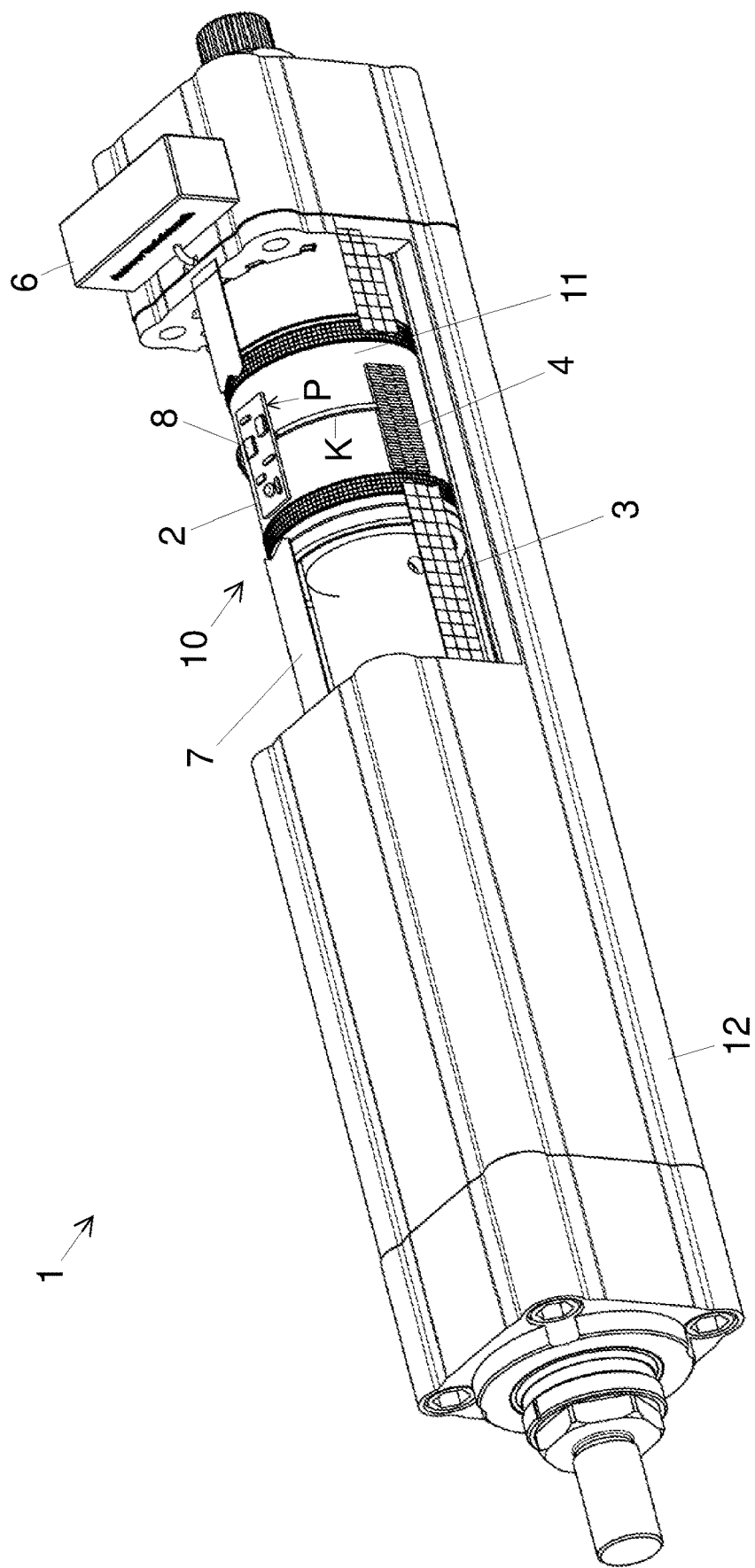
FIG. 2 shows an example of a linear actuator with a position sensor for determining a position of a carriage relative to a sheath tube of the linear actuator.

FIG. 1 shows an example of a position sensor 10, wherein the position sensor is used here to determine a position of a carriage relative to a sheath tube of a linear actuator (see FIG. 2). The position sensor comprises a second sensor component with a reading unit 2 that is configured to evaluate a capacitive signal in relation to the position of the carriage relative to the sheath tube. The reading unit 2 is arranged for this purpose at the carriage, for example mounted on the carriage, and can be moved together with the carriage in the axial direction within the sheath tube. This is suggested by the double arrow above the reading unit 2. A further part of the position sensor 10, namely a first sensor component, is arranged opposite the reading unit 2, and is configured to generate or at least to influence the capacitive signal in the reading unit 2. The first sensor component can, for example, be designed as a first electrode arrangement 3 that extends in the axial direction along the sheath tube.

The capacitive signal is, for example, generated in that the reading unit 2 interacts capacitively with a section A of the first electrode arrangement 3 that lies opposite, and the reading unit 2 generates a query signal, perhaps in the form of electric fields, that is accepted and influenced, for example phase-shifted, by the first electrode arrangement 3 in section A in a passive manner. The influenced query signal can be registered by the reading unit 2, in particular detected, whereby the capacitive signal is provided, in particular generated. The capacitive interaction between the reading unit 2 and the first electrode arrangement 3 in the section A, and thereby the influencing of the query signal, is preferably characteristic for this section A, and thereby of the position of the reading unit 2 or of the carriage relative to the first electrode arrangement 3, and thereby of the sheath tube. The position of the carriage relative to the sheath tube can accordingly be ascertained through the evaluation of the capacitive signal.

The first electrode arrangement 3 can here comprise an electrode pattern which, for example, is formed by individual electrodes 3a of the first electrode arrangement 3. The pattern preferably varies in the axial direction along the sheath tube, so that different capacitive interactions result depending on the position of the reading unit 2 relative to the first electrode arrangement 3 and the respectively opposite section A. The electrode pattern, which can, for example, be formed through varying distances and/or shapes of the individual electrodes 3*a* in different tracks relative to one another (see FIG. 3) thereby characterizes the position in relation to the sheath tube.

For capacitive interaction with the first electrode arrangement 3, the second sensor component preferably comprises a second electrode arrangement 4 which is aligned in a preferred manner parallel to the first electrode arrangement 3, i.e. in the axial direction, and is located opposite to it. To provide or at least influence the capacitive signal, the individual electrodes 3*a* of the first electrode arrangement 3 lie opposite the electrodes 4*a* of the second electrode arrangement 4 within the section A. The electrodes 4*a* of the second electrode arrangement 4 are thus arranged preferably in the axial direction along the reading unit 2, in particular a circuit board P of the reading unit 2.

The arrangement of the reading unit 2 at the movable mounted carriage has the advantage over systems in which the reading unit 2 is arranged at the sheath tube and in which, when there is a movement of the carriage, the first electrode arrangement 3 is moved past the reading unit 2, that all the components of the position sensor 10 can be housed by the sheath tube, regardless of the position of the carriage relative to the sheath tube. If the first electrode arrangement 3 were moved together with the carriage, then in certain positions of the carriage relative to the sheath tube it would inevitably protrude outside the sheath tube. Such configurations, which are disadvantageous in terms of damage to the first electrode arrangement 3, can be avoided through the arrangement of the reading unit 2 at the carriage.

The reading unit 2 can comprise evaluation electronics (not shown), configured for evaluation of the capacitive signal. In particular, the evaluation electronics can ascertain the position of the carriage relative to the sheath tube on the basis of the capacitive signal, and generate corresponding position data.

In order to be able to access this position data from outside the linear actuator, a transmission system 5 is provided through which the position data is transmitted from the reading unit 2, which is mounted movably relative to the sheath tube, at an interface 6 of the position sensor 10 that is arranged, in particular fixed, at the sheath tube. Preferably, the transmission system 5 comprises a part 5*a* mounted movably with the carriage, suggested by the double arrow, and a part 5*b* in a fixed position, opposite with reference to the sheath tube. The movably mounted part 5*a* is joined here to the reading unit 2, while the positionally fixed part 5*b* is joined to the interface 6. The position data can then be made available via the interface 6, in particular a data connection 6*a*, so that, for example, other devices such as, perhaps, a control device for controlling a drive associated with the linear actuator can access it.

In addition to position data, the transmission system 5 can preferably also be used to supply the position sensor 10, in particular the reading unit 2, with energy. The positionally fixed part 5*b* here for example transmits energy drawn from an electrical connection 6*b* of the interface 6, perhaps electrical current, to the movably mounted part 5*a*. The energy can be made available to the reading unit 2 via the connection between the movably mounted part 5*a* and the reading unit 2.

The transmission system 5 can, for example, comprise a flexible cable that connects the reading unit 2 to the interface 6, which however does not restrict the movement of the carriage relative to the sheath tube. Alternatively or in addition the transmission system 5 can also comprise a flexible, folded circuit board which, for example, unfolds as the distance between the carriage and the interface 6 increases.

FIG. 2 shows an example of a linear actuator 1 with a position sensor 10 for determining a position of a carriage 11 relative to a sheath tube 12 of the linear actuator 1. The carriage 11 here is mounted movably within the sheath tube 12 in the axial direction, for example on a threaded spindle of the linear actuator 1.

The position sensor 10 comprises a reading unit 2 for the evaluation of a capacitive signal that characterizes the position of the carriage 11 relative to the sheath tube 12. This signal can, for example, be provided, in particular generated, by a second electrode arrangement 4 of the reading unit 2. The second electrode arrangement 4 is arranged for this purpose at the sheath tube 12 opposite a first electrode arrangement 3, and extends in an axial direction along the sheath tube 12. The first electrode arrangement 3 is designed in such a way that the capacitive signal made available by the second electrode arrangement 4 is characteristic for the position of the carriage 11 relative to the sheath tube 12. As explained in conjunction with FIG. 1, the capacitive signal can be a query signal received and influenced, for example phase-shifted, by the first electrode arrangement 3, wherein, for example, through appropriate design of the first electrode arrangement 3, the degree of influence corresponds to the position in the sheath tube 12.

The result of the evaluation of the capacitive signal, in particular information regarding the position of the carriage 11 relative to the sheath tube 12, can be conveyed by a transmission system from the reading unit 2 to an interface 6. The transmission system is, in the present example, designed as an antenna system with a first antenna arrangement 7 that is arranged at the housing and connected to the interface 6, and a second antenna arrangement 8 that is arranged at the carriage 11. The first antenna arrangement 7, analogously to the first electrode arrangement 3, extends in an axial direction along the sheath tube 12. The second antenna arrangement 8 lies opposite the first antenna arrangement 7, so that by means of the first and second antenna arrangement 7, 8, position information can be transmitted electromagnetically, i.e. wirelessly, perhaps in the form of one or a plurality of radio signals, from the reading unit 2 which is mounted movably relative to the sheath tube 12 and thereby also relative to the first antenna arrangement 7 and the interface 6.

In addition, by means of the first and second antenna arrangement 7, 8, energy can also be transmitted wirelessly, i.e. inductively, from the interface 6 to the reading unit 2 for the energy supply of the reading unit 2, in particular for generating and evaluating the capacitive signal thereof.

In the present example, a part of the reading unit 2, in particular an evaluation electronics, is arranged on a circuit board P. The second electrode arrangement 4 is here connected via a cable K to the circuit board P. Due to the spatial distance between the circuit board P and the second electrode arrangement 4 shown in FIG. 2, an unwanted influence of the capacitive signal, perhaps by radio signals transmitted between the first and second antenna arrangement 7, 8, or an influence on these radio signals by the capacitive interaction of the first electrode arrangement 3 with the second electrode arrangement 4, can be avoided. In another example shown in FIG. 4, the second electrode arrangement 4 is also arranged on the circuit board P, and the first electrode arrangement 3 and the first antenna arrangement 7 are united in one component. The component extends in an axial direction (cf. FIG. 2). As shown in FIG. 4, the component has a side facing away from the reading unit 2, wherein the first antenna arrangement 7 is disposed on said side of said component facing away from said reading unit 2. In yet another example shown in FIG. 5, the first electrode arrangement 3 and the first antenna arrangement 7 are arranged on one circuit board, forming one component. Each of the first electrode arrangement 3 and the first antenna arrangement 7 are arranged in two neighboring sections that extend in an axial direction along the sheath tube 12. These sections preferably are on a side of the component facing the reading unit 2. The installation space available in the sheath tube 12 can thereby be used more efficiently.

FIG. 3 shows an example of a first electrode arrangement 3 with a plurality of individual electrodes $3a'$, $3a''$, $3a'''$ that are arranged in three tracks in the axial direction along a sheath tube (see FIG. 2). The distances between the individual electrodes $3a'$, $3a''$, $3a'''$ differ in each of the tracks; i.e. the distance between the electrodes $3a'$ in a first outer track can, as in the illustrated example, be larger than the distance between the electrodes $3a''$ in a central track, but smaller than the distance between the electrodes $3a'''$ in a second outer track.

This arrangement of differently spaced electrodes $3a'$, $3a''$, $3a'''$ in three tracks extending next to one another in an axial direction enables the provision, in particular generation, of a capacitive signal in a second electrode arrangement lying opposite the first electrode arrangement 3 of a reading unit arranged on a carriage of a linear actuator (see FIG. 2), on the basis of which the absolute position of the second electrode arrangement, or of the carriage, relative to the first electrode arrangement 3 can be determined.

LIST OF REFERENCE SIGNS

1 Linear actuator
2 Reading unit
3 First electrode arrangement
4 Second electrode arrangement
5 Transmission system
5a, 5b First, second part
6 Interface
6a Data connection
6b Electrical connection
7 First antenna arrangement
8 Second antenna arrangement
10 Position sensor
11 Carriage
12 Sheath tube
3a, $3a'$, $3a''$, $3a'''$, 4a Electrodes
A Section
P Circuit board
K Cable

The invention claimed is:

1. A linear actuator, comprising:
a sheath tube;
a carriage disposed at least partly inside said sheath tube and mounted movably relative to said sheath tube; and
a position sensor disposed on said sheath tube and on said carriage, said position sensor including:
a first sensor component disposed on said sheath tube and including an interface and a first electrode assembly extending within said sheath tube along an axial direction substantially along a travel path of said carriage, and
a second sensor component disposed on said carriage and including a reading unit, said reading unit having a second electrode assembly disposed opposite to said first electrode assembly for generating a capacitive signal indicative of a position of said carriage relative to said sheath tube, and said reading unit configured to evaluate the capacitive signal; and
said position sensor configured to provide a result of the evaluation at said interface.

2. The linear actuator according to claim 1, wherein the linear actuator, and said first sensor component includes a first electrode arrangement extending in an axial direction of said linear actuator.

3. The linear actuator according to claim 1, wherein said first electrode arrangement includes an electrode pattern varying in said axial direction and characterizing a position relative to said first electrode arrangement.

4. The linear actuator according to claim 1, wherein said first electrode arrangement is formed of a plurality of individual electrodes differing in at least one of their shape or their distance from one another.

5. The linear actuator according to claim 1, which further comprises:
a circuit board having a side facing toward said first sensor component and a side facing away from said first sensor component;
said second electrode arrangement being disposed on said side of said circuit board facing toward said first sensor component; and
said reading device having evaluation electronics disposed on said side of said circuit board facing away from said first sensor component.

6. The linear actuator according to claim 1, which further comprises a transmission system for transmitting at least one of information regarding the position of said second sensor component relative to said first sensor component or energy between said reading unit and said interface.

7. The linear actuator according to claim 6, wherein said transmission system is an antenna system, and at least one of said first electrode arrangement or said second electrode arrangement form components of said antenna system.

8. The linear actuator according to claim 7, wherein said antenna system includes a first antenna arrangement connected to said interface and a second antenna arrangement lying opposite to said first antenna arrangement and connected to said reading unit.

9. The linear actuator according to claim 8, wherein said first electrode arrangement and said first antenna arrangement of said antenna system together form one component extending in an axial direction.

10. The linear actuator according to claim 9, wherein said component has a side facing away from said reading unit, and said first antenna arrangement is disposed on said side of said component facing away from said reading unit.

11. The linear actuator according to claim 9, wherein:
said component has a side facing toward said reading unit;
said component has two sections on said side facing toward said reading unit;
said two sections extend parallel to one another in the axial direction; and
said first electrode arrangement and said first antenna arrangement are each disposed in a respective one of said two sections of said component.

12. The linear actuator according to claim 1, wherein said reading device is configured to generate position data based on the signal characterizing the position of said first sensor component relative to said second sensor component.

13. A method for determining a position of a sheath tube of a linear actuator relative to a carriage of the linear actuator disposed at least partly inside the sheath tube and mounted movably relative to the sheath tube, the method comprising the following steps:
  providing the linear actuator with a position sensor disposed on the sheath tube and on the carriage,
  providing the position sensor with:
    a first sensor component disposed on the sheath tube and including an interface and a first electrode assembly extending within the sheath tube along an axial direction substantially along a travel path of the carriage, and
    a second sensor component disposed on the carriage and including a reading unit, the reading unit including a second electrode assembly disposed opposite to the first electrode assembly,
  generating a capacitive signal indicative of a position of the carriage relative to the sheath tube by using the reading unit;
  evaluating the signal by using the reading unit; and
  providing a result of the evaluation available at the interface.

* * * * *